United States Patent [19]
Tomita et al.

[11] Patent Number: 5,378,450
[45] Date of Patent: Jan. 3, 1995

[54] PROCESS FOR PRODUCING HYDROGEN PEROXIDE

[75] Inventors: Takeshi Tomita; Yukio Ishiuchi; Michiya Kawakami; Hiromitsu Nagashima, all of Tokyo, Japan

[73] Assignee: Mitsubishi Gas Chemical Company, Inc., Tokyo, Japan

[21] Appl. No.: 229,429

[22] Filed: Apr. 12, 1994

[30] Foreign Application Priority Data

Apr. 19, 1993 [JP] Japan .................................. 5-091504

[51] Int. Cl.$^6$ .............................................. C01B 15/01
[52] U.S. Cl. ................................................. 423/584
[58] Field of Search ........................................ 423/584

[56] References Cited

U.S. PATENT DOCUMENTS

| | | |
|---|---|---|
| 3,336,112 | 8/1967 | Hooper ................................. 423/584 |
| 3,361,533 | 1/1968 | Hooper ................................. 423/584 |
| 4,009,252 | 2/1977 | Izumi et al. .......................... 423/584 |
| 4,279,883 | 7/1981 | Izumi et al. .......................... 423/584 |
| 4,681,751 | 7/1987 | Gosser et al. ........................ 423/584 |
| 4,772,458 | 9/1988 | Gosser et al. ........................ 423/584 |
| 5,236,692 | 8/1993 | Nagashima et al. ................. 423/584 |
| 5,292,496 | 3/1994 | Nagashima et al. ................. 423/584 |

FOREIGN PATENT DOCUMENTS

| | | | |
|---|---|---|---|
| 4127918 | 9/1992 | Germany ............................ | 423/584 |
| 55-18646 | 5/1980 | Japan . | |
| 56-47121 | 11/1981 | Japan . | |
| 123401 | 1/1985 | Japan . | |
| 63-156005 | 6/1988 | Japan . | |
| 285003 | 10/1992 | Japan ................................. | 423/584 |
| 1056121 | 1/1967 | United Kingdom . | |

OTHER PUBLICATIONS

Kito, et al., Ind. Eng. Chem. Res., vol. 31, "Estimation of the Acid Strength of Mixed Oxides by a Neural Network", pp. 979–981, 1992.

*Primary Examiner*—Wayne Langel
*Attorney, Agent, or Firm*—Wenderoth, Lind & Ponack

[57] ABSTRACT

The present invention provides a process for producing hydrogen peroxide by reacting oxygen and hydrogen in a reaction medium catalytically using, as a catalyst, a tin-modified platinum group metal supported on a carrier. In the process using said catalyst, the presence of halogen and acid in reaction medium is unnecessary unlike the prior art methods, and hydrogen peroxide of high concentration can be produced efficiently. Thus, the present process has no restriction for reactor material as seen the prior art methods and further allows for easy purification of produced hydrogen peroxide.

11 Claims, No Drawings

PROCESS FOR PRODUCING HYDROGEN PEROXIDE

DETAILED DESCRIPTION OF THE INVENTION

1. Field of the Invention

The present invention relates to an improved process for producing hydrogen peroxide by reacting oxygen and hydrogen catalytically in a reaction medium. More particularly, the present invention relates to a process for producing hydrogen peroxide, which comprises reacting oxygen and hydrogen in a reaction medium in the presence of a catalyst comprising a tin-modified platinum group metal.

2. Prior Art

The main process for industrial production of hydrogen peroxide currently in use is an autoxidation process using an alkylanthraquinone as a medium. This process has problems in that it requires many steps such as reduction of alkylanthraquinone, oxidation, extraction and separation of formed hydrogen peroxide, purification, concentration and the like, making large the equipment cost and operational cost. The process has further problems of the loss of alkylanthraquinone due to its deterioration, the deterioration of reduction catalyst, etc.

Because of these problems, there were studied various other processes. In some of these processes, hydrogen peroxide is produced directly from oxygen and hydrogen in a reaction medium using a catalyst. There were actually proposed processes of producing hydrogen peroxide from oxygen and hydrogen using a platinum group metal as a catalyst and, in these proposals, formation of hydrogen peroxide of relatively high concentration is reported [Japanese Patent Publication No. 47121/1981, Japanese Patent Publication No. 18646/1980, Japanese Patent Publication No. 23401/1989 and Japanese Patent Application Kokai (Laid-Open) No. 156005/1988]. In any of these processes, there is used, as the reaction medium, an aqueous solution containing an acid or an inorganic salt. In Japanese Patent Application Kokai (Laid-Open) No. 156005/1988 is disclosed a process for producing hydrogen peroxide from oxygen and hydrogen under pressure in an aqueous acidic solution, using a platinum group metal catalyst. This process can produce a solution of hydrogen peroxide of high concentration selectively by allowing said aqueous solution to further contain a halogen ion (e.g. bromine ion). In this process, however, it is necessary to allow the reaction medium to contain a promoter of halogen ion, in order to obtain hydrogen peroxide at a high selectivity.

Further in U.K. Patent No. 1056121 and U.S. Pat. No. 4,009,252 is disclosed a process for producing hydrogen peroxide directly from oxygen and hydrogen in a reaction medium, using a catalyst, wherein a stabilizer for hydrogen peroxide is added to the reaction medium in order to prevent the produced hydrogen peroxide from being decomposed by the impurity ion, etc. present in the reaction medium. These patents mention that the stabilizer for hydrogen peroxide may be any known stabilizer for hydrogen peroxide and that tin oxide, stannic acid or a stannic acid salt is preferable as the stabilizer. In the patents, any of these tin compounds is used for the purpose of isolating the ions, etc. which promote the decomposition of hydrogen peroxide, and no mention is made on the specific effect brought about by the modification of a platinum group metal with tin, as provided by the present invention. It is also clear from Comparative Example 3 of the present invention that the presence of a stannic acid salt in the reaction medium in an amount appropriate for use as a stabilizer for hydrogen peroxide allows for no high hydrogen peroxide selectivity.

Furthermore in Japanese Patent Publication No. 8646/1980 is disclosed a process for producing hydrogen peroxide by reacting oxygen and hydrogen catalytically in a reaction medium, in which process there can be used, as the reducing agent in the reduction treatment of a platinum group methyl (active element of catalyst) compound, not only hydrogen but also hydrazine, hydrogen sulfide, formalin, sodium thiosulfate, stannous chloride, etc. In this patent, stannous chloride is used as said reducing agent, and therefore this technique is different from the present invention in idea and function.

PROBLEMS TO BE SOLVED BY THE INVENTION

In the prior art methods for producing hydrogen peroxide by reacting oxygen and hydrogen catalytically in a reaction medium, the presence of an acid and a halogen ion in high concentrations in the reaction medium is necessary in order to obtain hydrogen peroxide at a concentration required in practical applications.

The presence of an acid and a halogen ion, however, generates big problems of dissolution of catalyst metal into reaction medium and the corrosion of reactor material, during the reaction. The amount of catalyst metal dissolved in reaction medium, in particular, increases in proportion to the concentration of halogen ion, and this is a very serious problem to the catalyst life when the catalyst is used continuously over a long period of time. Moreover, the kind of reactor material usable is restricted and an expensive reactor material is required. In order to solve these problems, it is necessary to develop a process for producing hydrogen peroxide without using any combination of an acid and a halogen ion, particularly a process for producing hydrogen peroxide of high concentration in a reaction medium containing no halogen ion.

Also in the prior art methods, since the produced hydrogen peroxide contains an acid and a halogen ion at high concentrations, post-treatments such as removal of acid and halogen ion are required depending upon the applications of obtained hydrogen peroxide, which poses a big economical problem. Hence, it is necessary to develop a process for producing hydrogen peroxide of high concentration in a reaction medium containing no halogen ion, preferably in a reaction medium consisting of water alone and containing neither acid nor halogen ion.

MEANS FOR SOLVING THE PROBLEMS

The present inventors made an extensive study in order to develop a process for producing hydrogen peroxide of high concentration by reacting oxygen and hydrogen catalytically in a reaction medium containing no halogen ion, preferably in a reaction medium consisting of water alone and containing neither halogen ion nor acid, in the presence or absence of an inert gas (e.g. nitrogen) which does not adversely affect the above reaction. As a result, the present inventors found that the above object can be achieved by using a tin-modified platinum group metal catalyst. The finding has led to the completion of the present invention.

The first object of the present invention is to provide a process for producing hydrogen peroxide by reacting oxygen and hydrogen catalytically in a reaction medium, wherein a tin-modified platinum group metal is used as a catalyst.

The second object of the present invention is to provide a process for producing a solution of hydrogen peroxide of high concentration by reacting oxygen and hydrogen catalytically in a reaction medium containing no halogen ion, using the above tin-modified platinum group metal catalyst (this: catalyst exhibits a specific effect as mentioned above in the reaction and the effect is hereinafter referred to as "promoter effect").

The third object of the present invention is to as carriers having said acidity such as proton form MFI-type zeloite and the like. The platinum group metal is preferably platinum or palladium with palladium being particularly preferable.

An example of the catalyst preparation method using a carrier is described. A carrier powder of given amount is suspended in water; to the suspension are dropwise added, simultaneously, a solution containing a given amount of the above-mentioned tin compound and a solution containing a given amount of a palladium compound (e.g. palladium nitrate, palladium chloride or tetramminepalladium complex); after the completion of the dropwise addition, the mixture is evaporated to dryness to obtain a carrier powder impregnated with a tin compound and a palladium compound; the powder is calcined in an air current at 100°–1,000° C., preferably at 300°–800° C. and then is subjected to a reduction treatment in a hydrogen-containing gas at 30°–500° C., preferably at 60°–300° C.; thereby, a catalyst used in the present invention can be prepared. The catalyst used in the present invention can also be predated by impregnating a catalyst in which palladium is supported on a carrier (this catalyst may be tin modified untreated or after treatment like calcining and reduction), with a tin compound and then subjecting the resulting material to calcining and a reduction treatment.

When there is used, as the carrier, a tin compound having a form suitable for use as a carrier, such as tin oxide, stannic acid, tin hydroxide, a composite oxide of tin and silicon, or the like, the catalyst used in the present invention can be prepared by simply supporting palladium per se on a carrier consisting of said tin compound, because palladium is modified by the tin contained in the carrier and thereby a promoter effect is exhibited. An example of such a catalyst preparation method is described. A tin compound powder used as a carrier is suspended in water; to the suspension is dropwise added a solution containing a given amount of palladium; after the completion of the dropwise addition, the mixture is evaporated to dryness to obtain a tin compound powder having palladium supported thereupon; the powder is calcined in an air stream at 100°–1,000° C., preferably at 300°–800° C.; the calcining product is subjected to a reduction treatment in a hydrogen-containing gas at 30°–50° C., preferably at 60°–300° C.; thereby, a catalyst used in the present invention can be prepared.

When there is used a carrier having solid acidity, it is not necessary to allow the reaction medium to contain an acid. Hence, the catalyst prepared by supporting a tin-modified palladium of the present invention on a carrier having solid acidity can produce hydrogen peroxide at a high selectivity in a reaction medium consisting of water alone.

The carrier having solid acidity, usable in the present invention has no particular restriction. Said carrier can be exemplified by zirconia having sulfuric acid supported thereupon, alumina having sulfuric acid supported thereupon, titania having sulfuric acid supported thereupon, proton type mordenite, proton form MFI-type zeolite and composite oxides having acidity. Examples of the composite oxides having acidity include $MoO_3$—$ZrO_2$, $WO_3$—$ZrO_2$, etc.; and tin-containing composite oxides known in literatures, etc., such as $SnO_2$—$SiO_2$, $SnO_2$—$ZrO_2$, $SnO_2$—$Nb_2O_5$, $SnO_2$—$B_2O_3$, $SnO_2$—$P_2O_5$, $SnO_2$—$TiO_2$, $SnO_2$—$MoO_3$, $SnO_2$—$Sb_2O_3$, $SnO_2$—$CeO_2$, $SnO_2$—$WO_3$ and the like (Ind. Eng. Chem. Rest. 1992, 31, 979–981). Among these composite oxides having acidity, those having high acidity are $MoO_3$—$ZrO_2$, $WO_3$—$ZrO_2$, $SnO_2$—$SiO_2$, $SnO_2$—$ZrO_2$ and $SnO_2$—$Nb_2O_5$. One of these solid acid carriers is prepared beforehand; on the carrier is supported tin-modified palladium; thereby, a catalyst used in the present invention can be prepared.

When silica is used as a carrier, this silica can easily form a composite oxide ($SnO_2$—$SiO_2$) with the tin used for modification of a platinum group metal, whereby solid acidity is exhibited. In this case, therefore, it is unnecessary to use a Sn—Si composite oxide carrier and, by supporting tin-modified palladium on a silica carrier, there can be prepared a catalyst capable of producing hydrogen peroxide at a high selectivity in a reaction medium consisting of water alone. When $SnO_2$—$SiO_2$ is used as a carrier, a platinum group metal is modified by the tin contained in the carrier and a promoter effect is exhibited. In this case, therefore, by supporting a platinum group metal alone on the carrier, there can be prepared a catalyst capable of producing hydrogen peroxide at a high selectivity in a reaction medium consisting of water alone.

There is no particular restriction as to the form of the carrier used in the preparation of the catalyst of the present invention for hydrogen peroxide production. A carrier having a form such as powder, pellets or the like can be used in the preparation of the present catalyst.

In the present invention, the amounts of platinum group metal and tin supported on carrier are not particularly restricted but are generally 0.1–10% and 0.5–90%, respectively, preferably 0.2–5% and 2–50%, respectively, of the weight of carrier.

The amount of the present catalyst used in production of hydrogen peroxide from oxygen and hydrogen is not particularly restricted but is generally 1 g or more per liter of the reaction medium. It is also possible to add a large amount of the catalyst to the reaction medium and conduct a reaction in a slurry state.

Water can be used as the reaction medium of the present invention. It is possible to add a stabilizer for hydrogen peroxide to the reaction medium (water). provide a process for producing a solution of hydrogen peroxide of high concentration by reacting oxygen and hydrogen catalytically in a reaction medium consisting of water alone and containing neither halogen ion nor acid, using a catalyst which is a tin-modified platinum group metal supported on a carrier showing solid acidity.

In the present invention, the modification of platinum group metal with tin can be conducted, for example, by the following method. That is, a tin-modified platinum group metal catalyst can be prepared by a method which comprises impregnating palladium black or platinum black with a tin compound solution, for example, a solution containing a tin compound such as tin chloride, tin acetate, tin oxalate or the like, then calcining the impregnation product in air, and further reducing the calcined product with, for example, a hydrogen gas. Alternatively, there may be used a method which comprises adding the above-mentioned tin compound solution to an aqueous solution containing a platinum group metal salt, evaporating the mixture to dryness, then calcining the residue in air, and further reducing the calcining product.

When the present catalyst is prepared by one of the above methods, a promoter effect, which is a feature of the present invention, is obtainable, but it is difficult to obtain a high catalytic activity stably. Hence, in order to obtain the present effect efficiently, it is preferable to use a catalyst preparation method using a carrier, shown below. The carrier used in the present invention has no particular restriction and can be any known carrier such as alumina, silica, magnesia, zirconia, titania, zeolite, active carbon, resin or carrier having solid acidity (e.g. zirconia having sulfuric acid supported thereupon, or proton form MFI-type zeolite). Among these carriers, preferable are metal oxides such as alumina, silica, titania, zirconia and the like, as well The stabilizer for hydrogen peroxide includes inorganic acids (e.g. phosphoric acid, sulfuric acid and nitric acid) (there are known stabilizers), phosphonic acid salts (e.g. sodium pyrophosphate), organic acids [e.g. aminotri(methylenephosphonic acid), 1-hydroxyethylidene-1,1-diphosphonic acid, ethylenediaminetetra(methylenephosphonic acid)] and sodium salts thereof, etc.

The production of hydrogen peroxide according to the present process can be carried out continuously or batchwise. The type of reactor has no particular restriction and may be any of a fixed bed type, a fluidized bed type, an agitation type, etc.

The hydrogen peroxide production according to the present process is carried out by reacting oxygen and hydrogen in a reaction medium in the presence of a catalyst in the presence or absence of an inert gas (e.g. nitrogen) which does not adversely affect the reaction, generally under the conditions of $3 \times 10^5$–$1.5 \times 10^7$ Pa (3–150 kg/cm$^2$.G) (reaction pressure), 0°–50° C. (reaction temperature) and 30 minutes to 6 hours (reaction time).

EFFECTS OF THE INVENTION

In the process of the present invention, the hydrogen selectivity in the hydrogen peroxide formation reaction is high and a promoter effect is exhibited owing to the use of the tin-modified platinum group metal catalyst of present invention. Thus, in the present process, a solution of hydrogen peroxide of high concentration can be produced efficiently in a reaction medium containing no halogen ion (in the prior arts, the reaction medium contains a halogen ion). When a carrier having solid acidity is used in the preparation of the catalyst of the present invention, the reaction medium used need not contain any halogen ion or any acid, which reduces the restriction for reactor material and requires no post-treatments such as removal of acid and halogen ion from produced hydrogen peroxide; as a result, the hydrogen peroxide purification step is simple as compared with that of the prior arty the previously-mentioned problems are solved; and there is provided a novel process for hydrogen peroxide production which is very economical and suited for large-scale production.

EXAMPLES

The present invention is hereinafter described more specifically by way of Examples and Comparative Examples. In the Examples, the analytical values for gas composition are values measured by gas chromatography; the concentration of the hydrogen peroxide formed in reaction medium was measured by titration with sulfuric acid-acidified potassium permanganate; and the content of tin in reaction medium was measured by inductively coupled plasma emission spectroscopy using an SPS1200VR type spectrophotometer made by Seiko Instrument Inc.

Example 1

Catalyst preparation was conducted as follows. That is, 1.5 g of commercial tin (II) acetate (a product of Kanto Chemical Company, Inc.) was weighed in a 500-ml beaker. 150 ml of acetic acid was added and the mixture was heated and made into a solution. The solution was cooled to room temperature to prepare an acetic acid solution containing tin acetate. In this solution was suspended 5 g of a commercial silicon dioxide powder having an average particle diameter of 25 μm (a product of Mizusawa Industrial Chemicals, Ltd.). The suspension was heated at 80° C. with stirring, to evaporate and remove acetic acid in the suspension. The residue was dried to obtain a powder. The powder was calcined in an air stream at 500° C. for 3 hours. The calcined product was suspended in 75 ml of water and the mixture was stirred. To the mixture being stirred was slowly added dropwise 25 ml of an aqueous palladium nitrate solution containing 1 g/1 of palladium. After the completion of the dropwise addition, the mixture was heated to 80° C. with stirring, to evaporate and remove the water in the mixture. The residue was dried to obtain a powder. The powder was calcined in an air stream at 500° C. for 3 hours and then reduced in a hydrogen stream at 120° C. for 2 hours to obtain a catalyst in which palladium and tin were supported in amounts of 0.5% by weight and 15% by weight, respectively, based on the weight of the silicon dioxide used.

Hydrogen peroxide production from oxygen and hydrogen was carried out as follows. 10 g of water was placed in a glass vessel having an internal volume of 65 ml. Thereto was added 50 mg of the above-prepared catalyst. The glass vessel was placed in a 100-ml autoclave. The air in the autoclave was replaced by a mixed gas composed of 3.5% by volume of hydrogen gas, 35% by volume of oxygen gas and 61.5% by volume of nitrogen gas. Then, the vessel inside was pressurized to $5 \times 10^6$ Pa (50 kg/cm$^2$.G) with the gas of same composition. The contents in the vessel were stirred at 2,000 rpm for 1 hour with the temperature being kept at 10° C. After the completion of the stirring, the hydrogen peroxide concentration in the reaction medium was 0.58% by weight and the hydrogen selectivity was 65%. The hydrogen selectivity was calculated using the following formula.

Hydrogen selectivity (%) = [(moles of hydrogen peroxide formed by reaction) ÷ (theoretical moles of hydrogen peroxide calculated from hydrogen amount consumed)] × 100

The concentration of tin in the reaction medium after reaction was 0.7 ppm.

Comparative Example 1

Catalyst preparation was conducted as follows. 5 g of a commercial silicon dioxide powder having an average particle diameter of 25 μm (a product of Mizusawa Industrial Chemicals, Ltd.) was suspended in 75 ml of water. To the suspension being stirred was slowly added dropwise 25 ml of an aqueous palladium nitrate solution contained 1 g/l of palladium. After the completion of the dropwise addition, the mixture was heated to 80° C. with stirring, to evaporate and remove the water in the mixture. The residue was dried to obtain a powder. The powder was calcined in an air stream at 500° C. for 3 hours and then reduced in a hydrogen stream at 120° C. for 2 hours to obtain a catalyst in which palladium was supported in an amount of 0.5% by weight based on the weight of the silicon dioxide used. Production of hydrogen peroxide from oxygen and hydrogen was conducted using the same procedure as in Example 1. After 1 hour of stirring, the hydrogen peroxide concentration in the reaction mixture was 0.0% by weight and the hydrogen selectivity was 0.0%.

Example 2

Hydrogen peroxide production was conducted with the same catalyst and same procedure as in Example 1 except that 10 g of water as reaction medium was replaced by 10 g of an aqueous solution containing 75 ppm of ethylenediaminetetra(methylenephosphonic acid). After 1 hour of stirring, the hydrogen peroxide concentration in the reaction medium was 0.64% by weight and the hydrogen selectivity was 78%.

Example 3

Catalyst preparation was conducted as follows. That is, 1.5 g of commercial tin (II) acetate (a product of Kanto Chemical Company, Inc.) was dissolved in 150 ml of acetic acid with heating. The solution was cooled to room temperature to obtain a solution of tin acetate in acetic acid. 5 g of a commercial silicon dioxide powder having an average particle diameter of 25 μm (a product of Mizusawa Industrial Chemicals, Ltd.) was weighed in a 500-ml beaker, after which 200 ml of water was added to suspend the silicon dioxide powder therein. To the suspension being stirred were slowly added dropwise the above-prepared solution of tin acetate in acetic acid and 25 ml of an aqueous palladium nitrate solution containing 1 g/l of palladium, simultaneously. After the completion of the dropwise addition, the mixture was heated to 80° C. with stirring, to evaporate and remove the acetic acid and water in the mixture. The residue was dried to obtain a powder. The powder was calcined in an air stream at 500° C. for 1 hours and then reduced in a hydrogen stream at 250° C. for 1 hour to obtain a catalyst in which palladium and tin were supported in amounts of 0.5% by weight and 15% by weight, respectively, based on the weight of the silicon dioxide used.

Production of hydrogen peroxide from oxygen and hydrogen was conducted with the same procedure as in Example 1 except that 10 g of water as reaction medium was replaced by 10 g of an acidic solution containing 0.1 mole/l of sulfuric acid. After 1 hour of stirring, the hydrogen peroxide concentration in the reaction medium was 0.65% by weight and the hydrogen selectivity was 65%. The concentration of tin in the reaction medium after reaction was 0.6 ppm.

Comparative Example 2

Preparation of palladium catalyst and production of hydrogen peroxide were conducted with the same procedure as in Example 3 except that in the preparation of palladium catalyst, no solution of tin acetate in acetic acid was used and only an aqueous palladium nitrate solution was used. After 1 hour of stirring, the hydrogen peroxide concentration in the reaction medium was 0.0% by weight and the hydrogen selectivity was 0.0%.

Comparative Example 3

Preparation of palladium catalyst was conducted with the same procedure as in Example 3 except that no solution of tin acetate in acetic acid was used and only an aqueous palladium nitrate solution was used. Production of hydrogen peroxide from oxygen and hydrogen was conducted with the same procedure as in Example 3 except that there was used, as the reaction medium, 10 g of an aqueous solution containing 0.1 mole/l of sulfuric acid and 50 ppm of sodium stannate. After 1 hour of stirring, the hydrogen peroxide concentration in the reaction medium was 0.0% by weight and the hydrogen selectivity was 0.0%.

Example 4

A tin-modified palladium catalyst was prepared with the same procedure as in Example 3 except that the silicon dioxide powder as carrier was replaced by a zirconia-supported molybdenum powder prepared as follows and that the temperature of reduction in a hydrogen stream was changed to 120° C. That is, 61.4 g of commercial zirconium hydroxide (a product of Mitsuwa Chemical Company) was mixed with an aqueous solution containing 3.1 g of commercial ammonium molybdate (a product of Koso Chemical Company, Ltd.), to conduct supporting so that the amount of molybdenum oxide became 5% by weight based on zirconium oxide. The mixture was dried in a drier at 110° C. for 24 hours. The resulting material was calcined in an air stream at 600° C. for 3 hours to obtain a zirconia-supported molybdenum powder having solid acidity.

Production of hydrogen peroxide from oxygen and hydrogen was conducted with the same procedure as in Example 1. After 1 hour of stirring, the hydrogen peroxide concentration in the reaction medium was 0.38% by weight and the hydrogen selectivity was 52%. The concentration of tin in the reaction medium after reaction was 0.7 ppm.

Comparative Example 4

Preparation of palladium catalyst and production of hydrogen peroxide were conducted with the same procedure as in Example 4 except that in the preparation of palladium catalyst, no solution of tin acetate in acetic acid was used and only an aqueous palladium nitrate solution was used. After 1 hour of stirring, the hydrogen peroxide concentration in the reaction medium was 0.0% by weight and the hydrogen selectivity was 0.0%.

Example 5

Preparation of palladium catalyst and production of hydrogen peroxide were conducted with the same procedure as in Example 4 except that the zirconia-supported molybdenum powder as carrier was replaced by a proton form MFI-type zeolite powder (Si/Al=15, Ho < −5.6). After 1 hour of stirring, the hydrogen peroxide concentration in the reaction medium was 0.33% by weight and the hydrogen selectivity was 48%. The tin concentration in the reaction mixture was 0.8 ppm.

Comparative Example 5

Preparation of palladium catalyst and production of hydrogen peroxide were conducted with the same procedure as in Example 5 except that in the preparation of palladium catalyst, no solution of tin acetate in acetic acid was used and only an aqueous palladium nitrate solution was used. After 1 hour of stirring, the hydrogen peroxide concentration in the reaction medium was 0.0% by weight and the hydrogen selectivity was 0.0%.

Example 6

Preparation of palladium catalyst and production of hydrogen peroxide were conducted with the same procedure as in Example 3 except that the silicon dioxide powder as carrier was replaced by a commercial aluminum oxide powder (aluminum oxide 90 active, neutral; a product of MERCK Co.) and that the temperature of reduction in a hydrogen stream was changed to 120° C. After 1 hour of stirring, the hydrogen peroxide concentration in the reaction medium was 0.40% by weight and the hydrogen selectivity was 56%. The tin concentration in the reaction medium was 1.2 ppm.

Comparative Example 6

Preparation of palladium catalyst and production of hydrogen peroxide were conducted with the same procedure as in example 6 except that in the preparation of palladium catalyst, no solution of tin acetate in acetic acid was used and only an aqueous palladium nitrate solution was used. After 1 hour of stirring, the hydrogen peroxide concentration in the reaction medium was 0.0% by weight and the hydrogen selectivity was 0.0%.

Example 7

Preparation of palladium catalyst and production of hydrogen peroxide were conducted with the same procedure as in Example 6 except that the aluminum oxide powder as carrier was replaced by a commercial titanium oxide powder (JA-1 manufactured by TAYCA Corporation). After 1 hour of stirring, the hydrogen peroxide concentration in the reaction medium was 0.38% by weight and the hydrogen selectivity was 60%. The tin concentration in the reaction medium was 0.5 ppm.

Comparative Example 7

Preparation of palladium catalyst and production of hydrogen peroxide were conducted with the same procedure as in Example 7 except that in the preparation of palladium catalyst, no solution of tin acetate in acetic acid was used and only an aqueous palladium nitrate solution was used. After 1 hour of stirring, the hydrogen peroxide concentration in the reaction medium was 0.0% by weight and the hydrogen selectivity was 0.0%.

Example 8

Preparation of palladium catalyst and production of hydrogen peroxide were conducted with the same procedure as in Example 6 except that the aluminum oxide powder as carrier was replaced by a commercial zirconium oxide powder (a product of Koso Chemical Company, Ltd.). After 1 hour of stirring, the hydrogen peroxide concentration in the reaction medium was 0.44% by weight and the hydrogen selectivity was 57%. The tin concentration in the reaction medium was 0.3 ppm.

Comparative Example 8

Preparation of palladium catalyst and production of hydrogen peroxide were conducted with the same procedure as in Example 8 except that in the preparation of palladium catalyst, no solution of tin acetate in acetic acid was used and only an aqueous palladium nitrate solution was used. After 1 hour of stirring, the hydrogen peroxide concentration in the reaction medium was 0.0% by weight and the hydrogen selectivity was 0.0%.

Example 9

Catalyst preparation was conducted as follows. That is, 10 g of a commercial tin (IV) oxide powder (a product of Kanto Chemical Company, Inc.) was suspended in 150 ml of water. To the suspension being stirred was slowly added dropwise 50 ml of an aqueous palladium nitrate solution containing 1 g/l of palladium. After the completion of the dropwise addition, the mixture was allowed to stand at normal temperature for 12 hours and then heated to 80° C. with stirring, to evaporate and remove the water in the mixture. The residue was dried to obtain a powder. The powder was calcined in an air stream at 500° C. for 6 hours and then reduced in a hydrogen stream at 80° C. for 1 hour to obtain a catalyst in which palladium was supported in an amount of 0.5% by weight based on the weight of tin (IV) oxide used. Production of hydrogen peroxide from oxygen and hydrogen was carried out with the same procedure as in Example 3. After 1 hour of stirring, the hydrogen peroxide concentration in the reaction medium was 0.38% by weight and the hydrogen selectivity was 48%.

What we claimed is:

1. A process for producing hydrogen peroxide by reacting oxygen and hydrogen catalytically in a reaction medium, wherein a tin-modified platinum group metal is used as a catalyst.

2. The process set forth in claim 1, wherein the platinum group metal is palladium or platinum.

3. The process set forth in claim 1, wherein the catalyst is a tin-modified platinum group metal supported on a carrier.

4. The process set forth in claim 3, wherein the amount of platinum group metal and tin supported on carrier are 0.1–10% and 0.5–90% respectively of the weight of carrier.

5. The process set forth in claim 3, wherein the carrier is a metal oxide.

6. The process set forth in claim 3, wherein the carrier has solid acidity.

7. The process set forth in claim 6, wherein the carrier having solid acidity is zirconia having sulfuric acid supported thereupon, alumina having sulfuric acid supported thereupon, titania having sulfuric acid supported thereupon, a composite oxide of molybdneum and zirconium, a composite oxide of tungsten and zirconium, a composite oxide of tin and silicon, a compound oxide of tin and zirconium, proton form mordenite or proton form MFI-type zeolite.

8. The process set forth in claim 1, wherein the reaction medium is water.

9. The process set forth in claim 1, wherein the reaction medium is an aqueous solution containing a stabilizer for hydrogen peroxide.

10. The process set forth in claim 9, wherein the stabilizer for hydrogen peroxide is at least one compound selected from the group consisting of aminotri(methylene-phosphonic acid), 1-hydroxyethylidene-1,1-diphosphonic acid, ethylenediaminetetra(methylenephosphonic acid), sodium salts thereof, phosphoric acid, sulfuric acid, nitric acid and sodium pyrophosphate.

11. The process set forth in claim 1, which comprises reacting oxygen and hydrogen in a reaction medium in the presence of a catalyst in the presence or absence of an inert gas at a reaction temperature of 0°–50° C. at a reaction pressure of 3–150 kg/cm$^2$.G.

* * * * *